H. R. PARKER.
HEADLIGHT CONTROLLER.
APPLICATION FILED JAN. 15, 1908.
900,198.
Patented Oct. 6, 1908.
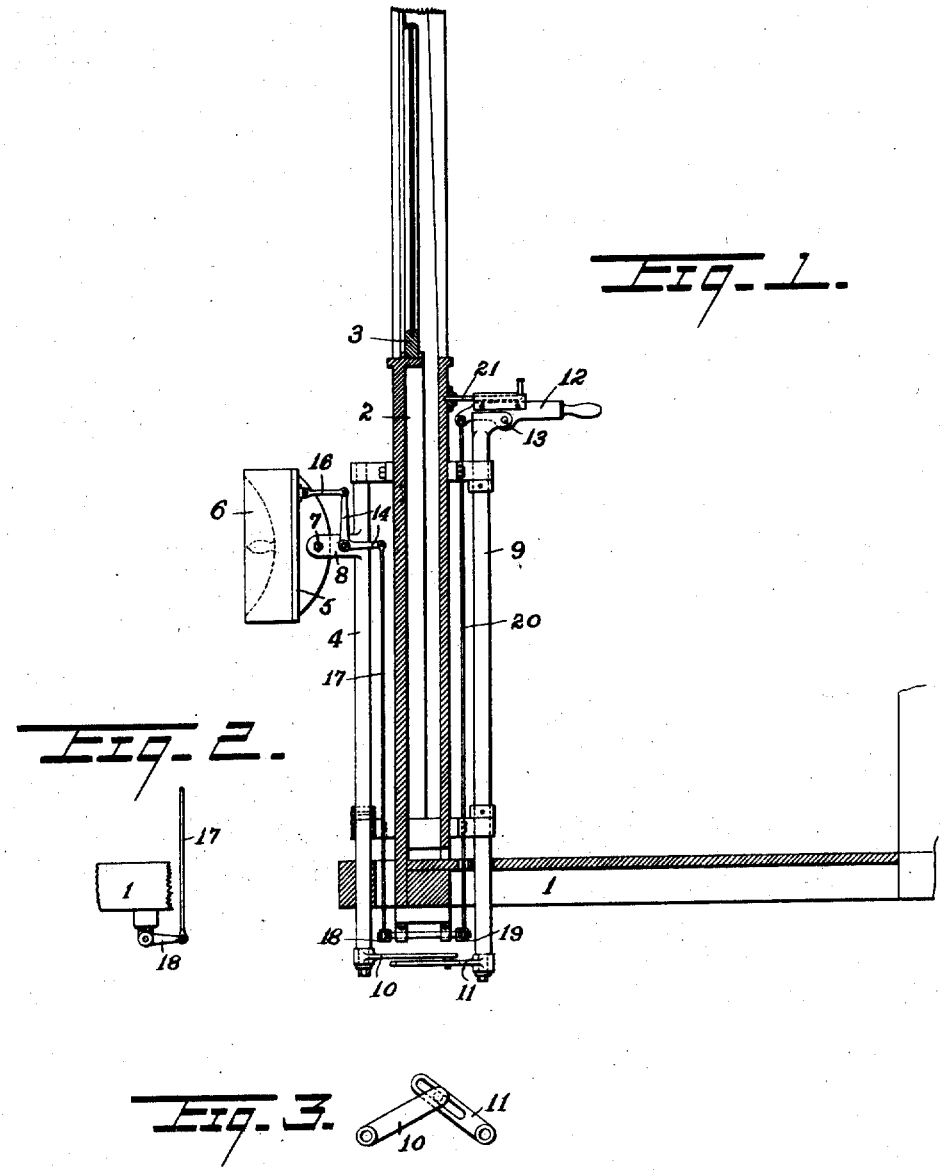
Henry R. Parker,
Inventor
Witnesses
By
Attorney

UNITED STATES PATENT OFFICE.

HENRY R. PARKER, OF READING, PENNSYLVANIA.

HEADLIGHT-CONTROLLER.

No. 900,198.

Specification of Letters Patent.

Patented Oct. 6, 1908.

Application filed January 15, 1908. Serial No. 410,903.

*To all whom it may concern:*

Be it known that I, HENRY R. PARKER, a citizen of the United States, and a resident of the city of Reading, in the county of Berks and State of Pennsylvania, have invented certain new and useful Improvements in Headlight-Controllers, of which the following is a specification.

My invention relates to head lights for cars, and particularly to mechanism for operating the same so as to throw the light in varying directions in advance of the car, independent of the line of travel, and at the will of the operator,—as fully explained in the accompanying drawing and specification and particularly pointed out in the claims.

Figure 1 is a sectional elevation of a car embodying my invention. Figs. 2 and 3 are detail views.

In the drawings 1 is the platform of a car and 2 the dash of the same. This dash 2 is made hollow to permit the lowering of the upper sash portion 3 into same, and it is necessary to carry the operating mechanism for the manipulation of the head light around this dash so as not to interfere with the sash opening. To this end I mount a vertically revoluble shaft 4 in bearings on the outer face of the dash 2, the lower end of the shaft projecting below the floor of the platform 1, and the upper end carrying a light bracket 5, upon which may be placed any suitable head light as indicated at 6; said bracket 5 being pivoted at 7 to an arm 8 formed on the shaft 4. A shaft, similar to shaft 4, marked 9 in the drawing, is mounted in bearings on the inner face of the dash 2, parallel with the outer shaft, and projects through the floor 1 of the platform. These shafts 4 and 9 are operatively connected so as to turn upon their axes in unison, the method shown consisting of pin and slot engaging arms, marked respectively 10 and 11, secured to the lower ends of the shafts beneath the car floor, and an operating handle 12 is mounted in the upper end of shaft 9 to turn same. It will be readily seen that any turning movement given to shaft 9 will be transmitted to the head light 6, mounted on the connected shaft 4, to swing the light in a horizontal plane.

The handle 12 is mounted on a pivot 13 in a slotted upper portion of shaft 9, and its vertical swing upon its pivot is carried to the light bracket 5 to turn same upon its pivot 8 and move the head light in a vertical plane. The operating mechanism for this vertical movement of the light bracket from the handle consists of a bell crank 14, pivoted at 15 on the arm 8 of shaft 4, and connected by a link 16 with said bracket 5 to control the movement of the latter upon its pivot 7; a rod 17 connecting the opposite end of said bell crank 14 with a double crank 18—19 mounted beneath the floor of the car; and a similar rod 20 connecting the end 19 of the double crank with the end of the pivoted handle 12. It will thus be seen that the handle 12 has two movements of control for the head light, either of which may be independently made, or they may be jointly used to direct the light at any desired point in advance of the car and at the will of the operator.

In order to lock my controlling device in fixed position, I provide a bolt 21 secured to handle 12 and sliding into engagement with the dash to hold said handle against either horizontal or vertical movement and thus secure the light in fixed position.

My invention provides for ready and positive control of the head light and easy manipulation of the direction of its rays of light; and it is simple and strong and readily applied to any car without interference with the functions of the dash or the running mechanism of the car.

What I claim is:—

1. A head-light controller for cars comprising two parallel rotary shafts arranged on the outer and inner sides of the car dash, a head light carried by the outer shaft, an operating handle on the inner shaft, and an operating connection between said shafts, substantially as set forth.

2. In a head light controller for cars, a head light bracket pivotally mounted outside the car dash, a handle pivotally mounted inside the dash, a bell crank controlling the movement of said pivoted bracket, and operating mechanism connecting said bell crank and pivoted handle comprising a rod outside the dash, a rod inside the dash, and a double crank, substantially as set forth.

3. In a head light controller for cars, two parallel rotary shafts arranged on the outer and inner sides of the car dash, an operating connection between said shafts outside the car body, a head light pivoted to the outer shaft, an operating handle pivoted to the inner shaft, a bell crank controlling the movement of said pivoted light, and operating mechanism connecting said bell crank and pivoted handle comprising a rod outside the dash, a rod inside the dash, and a double crank, all substantially as described.

4. A head light controller for cars comprising two parallel rotary shafts arranged on the outer and inner sides of the car dash, an operating connection between said shafts, a head light pivotally mounted on the outer shaft, an operating handle therefor pivotally mounted on the inner shaft, and a locking device to hold said light in fixed position.

In testimony whereof, I affix my signature, in the presence of two witnesses.

HENRY R. PARKER.

Witnesses:
D. M. STEWART,
W. G. STEWART.